Sept. 12, 1933.   E. L. BARRETT   1,926,256
REMOTE CONTROL DEVICE FOR RADIO RECEIVING APPARATUS
Filed Aug. 1, 1931   2 Sheets-Sheet 1
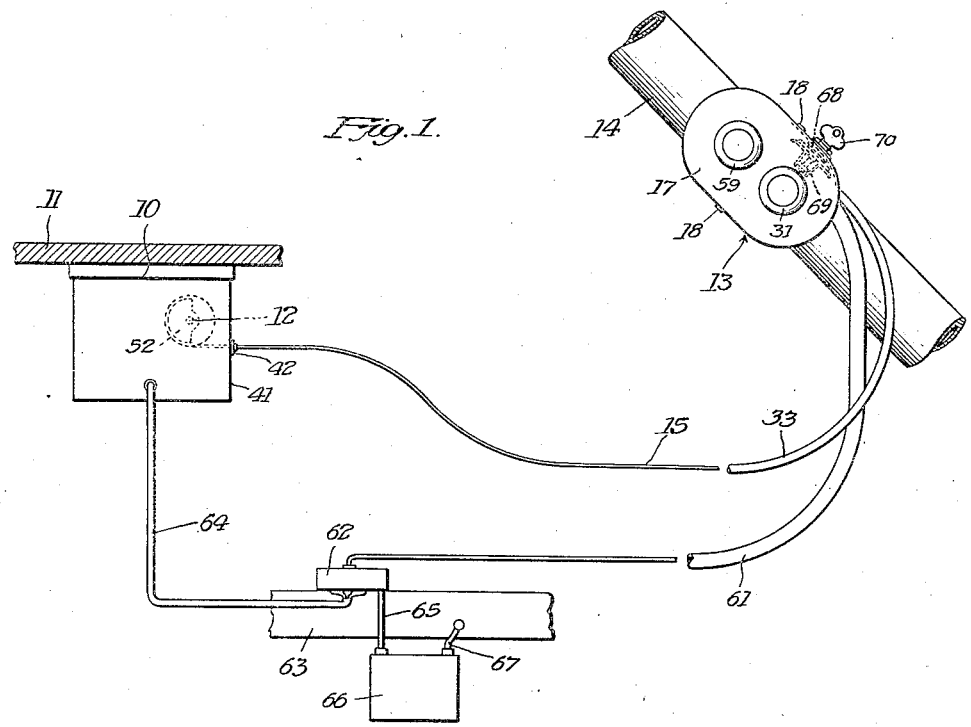
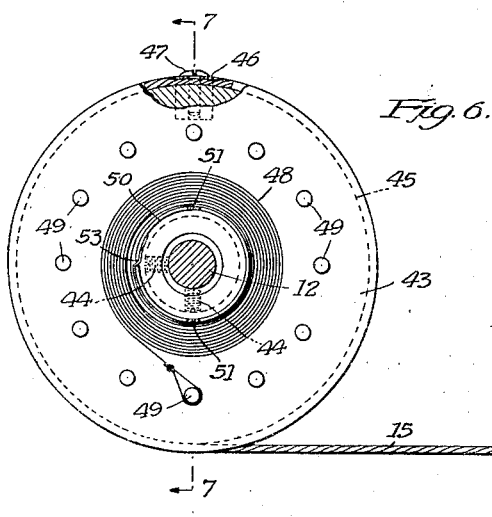
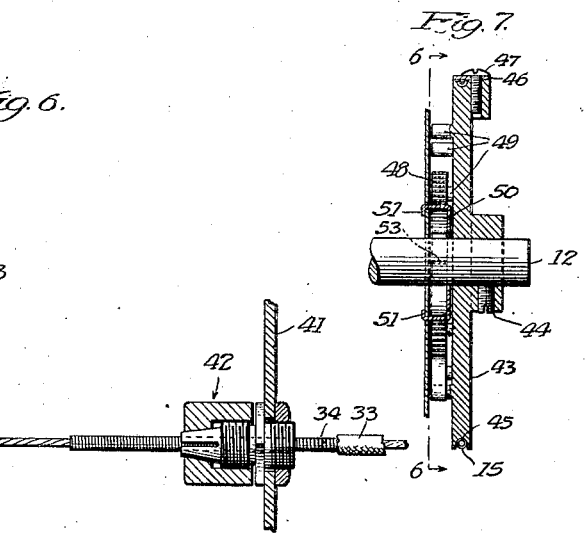
Inventor
Edward L. Barrett

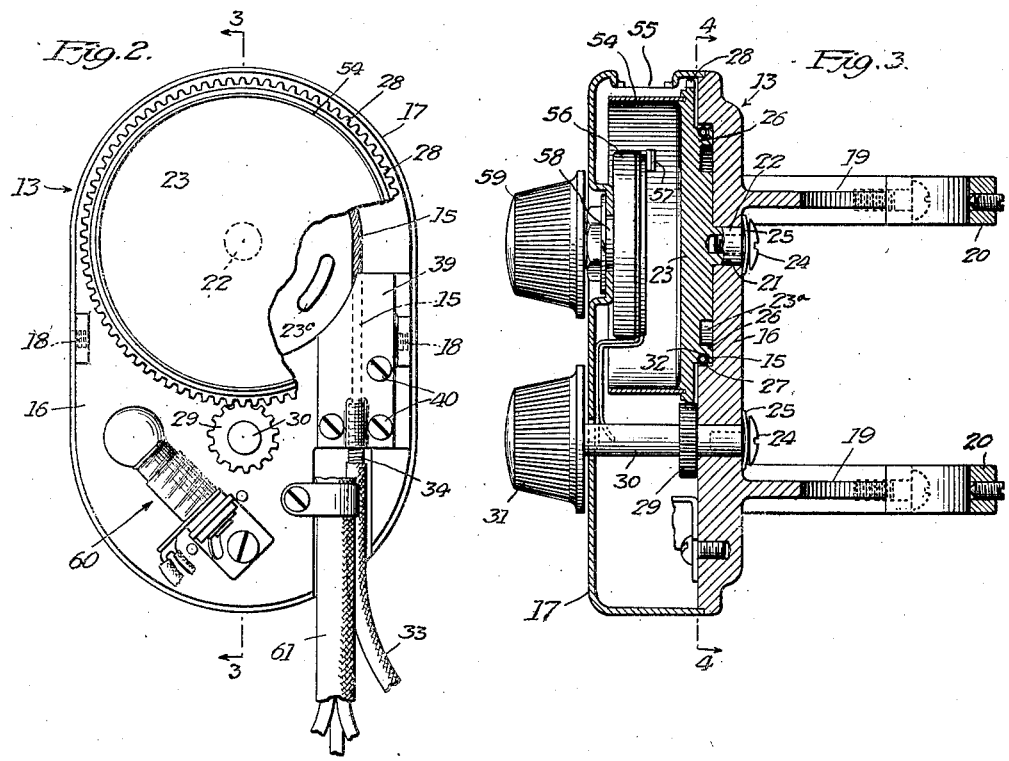
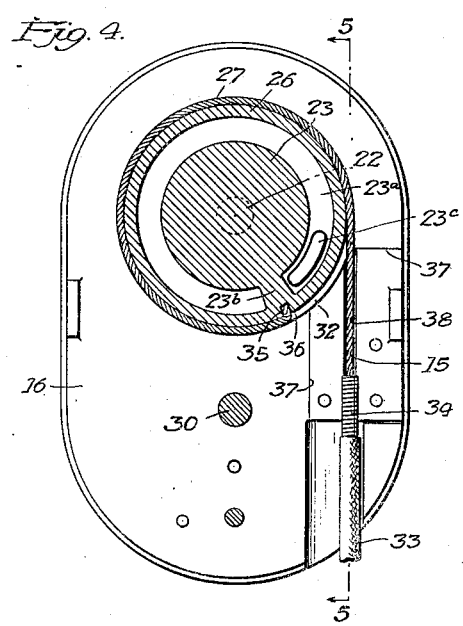
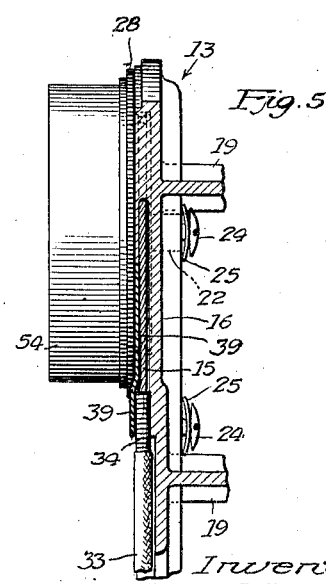

Patented Sept. 12, 1933

1,926,256

UNITED STATES PATENT OFFICE 1,926,256

REMOTE CONTROL DEVICE FOR RADIO RECEIVING APPARATUS

Edward L. Barrett, Chicago, Ill., assignor to Utah Radio Products Co., Chicago, Ill., a corporation of Illinois Application August 1, 1931. Serial No. 554,394

19 Claims. (Cl. 250—20)

The invention relates to remote control devices for radio receiving sets and more particularly to devices of this character which are adapted to be used in connection with receiving sets installed in automobiles and other means of transportation.

An object of the invention is to provide a remote control device of this character which can be situated at a reasonable distance from the receiving apparatus in a position which is convenient to the driver of the vehicle or another passenger, and which is operable to control all of the adjustments of the receiving set.

Another object of the invention is to provide in a device of this character a mechanical connection extending between the remotely positioned control box of the radio receiving set, which connection embodies an association of parts for preventing the accumulation of slack, backlash, or lost motion of any kind in such connection whereby the tuning and the tuned elements are maintained in synchronism.

A further and more specific object of the invention resides in the provision of a rotatable tuning element which is located at a remote point and is connected with another rotatable element on the condenser shaft of the receiving set by a flexible reciprocable member, means being incorporated in the mechanism for preventing play or looseness in the connections whereby operation of the two rotatable elements is synchronous.

Another object is to provide a suitably housed control mechanism adapted to be mounted quickly and easily on the steering column of a vehicle, the parts of said mechanism being compactly arranged in a novel manner within the housing member to produce a small, neat unit which affords convenient, efficient and accurate control of the receiving set from a point where manipulations of the mechanism may be readily observed.

A further object is to provide an improved remotely positioned control mechanism which includes a compact combined gear and pulley element and parts cooperating therewith for transmitting movement to a flexible connecting member without the introduction of lost motion or play.

In conjunction with the foregoing object, other objects reside in the association with the combined gear and pulley element of means for indicating the position of the tuned part of the receiving set, of means for varying the frictional resistance to movement of the combined element, and of means for limiting the extent of movement of said element.

Other objects and advantages will become apparent in the following description and from the accompanying drawings, in which:

Figure 1 is a somewhat diagrammatic view showing the relative location of the parts.

Fig. 2 is a plan view of the remote control box with the cover removed.

Fig. 3 is a longitudinal section through the control box taken along the line 3—3 of Fig. 2.

Fig. 4 is a section through the box taken on the line 4—4 of Fig. 3.

Fig. 5 is a longitudinal section on the line 5—5 of Fig. 4.

Fig. 6 is a face view of the control member associated with the receiver looking in the direction of the arrows 6—6 in Fig. 7.

Fig. 7 is a radial section through said member as indicated by the line 7—7 of Fig. 6.

The general organization of the present device is illustrated in Fig. 1 of the drawings wherein 10 designates a radio receiving set of any suitable construction which is shown as being rigidly secured to a rigid part 11 of the automobile. The location of the receiving set may be at any number of positions on the automobile, as for example under the floor boards of the body or under either the front or rear seats. The radio receiving set embodies the usual condenser shaft 12, rotation of which, in the customary manner, is effective to adjust the set to different positions of reception. The condenser shaft 12 is operated from any position which is convenient to the operator of the automobile or to one of the passengers thereof by means of mechanism housed in a control box generally designated 13 and shown, in the present embodiment, as being rigidly secured to the steering column 14 of the vehicle. A flexible mechanical connection 15 extends from the control box 13 to the receiver for transmitting control movements from one to the other.

For a more particular description of the mechanism within the control box 13, reference is had to Figs. 2 to 5, inclusive. The control box is generally oval in shape and embodies a flat base 16 of substantial thickness and a cup-shaped cover element 17 which is suitably secured to the base as by screws 18 (Fig. 1). The base 16 has, in this instance, two pairs of rearwardly extending arms 19 arranged to straddle the steering column 14 of the vehicle, and brackets 20 fastened to these arms and extending therebetween rigidly hold the control box on the column.

The control box encloses the manually manipulable element which is adjusted by the operator to tune the receiver. Thus, the base 16 is bored, as at 21, to receive a stub shaft 22 which may be formed as an integral part of a circular disk 23. A screw 24 engages the end of the shaft 22 to maintain the disk properly within the housing, and a spring washer 25 is preferably interposed between the head of the screw and the adjacent side of the base. The peripheral edge of the disk 23 adjacent the base is cut-away to provide an annular portion 26 of restricted diameter, which portion is snugly receivable within an annular socket or nest 27 provided as a recess in the base. Peripherally, the portion of the disk 23 of largest diameter has gear teeth 28 formed therein for engagement with teeth on a gear 29 which is carried by a shaft 30 journaled in the base. If desired, the shaft 30 may be retained on the base by another screw 24 and washer 25 arrangement. The two screw and washer arrangements provide simple yet efficient means for variably adjusting the frictional resistance to movement which is imposed on the disk 23. The free end of the shaft 30 extends through the cover 17 and carries a finger piece or tuning knob 31.

The rotary movement which may be imparted to the disk 23 by manipulation of the knob 31 is translated into reciprocatory movement of the flexible element 15, which extends to the receiver. Thus, the restricted portion of the disk 23 is peripherally grooved, as at 32, to form what may be termed a pulley arranged to receive one end of the flexible element 15. The preferred form of flexible element is the reciprocable part of what is commonly termed Bowden wire, the construction of which includes an outer protected fabric casing 33, a supporting and guiding tube 34 formed of closely coiled wire, and the inner flexible member 15. The inner flexible element 15 and the tube 34 are so associated that the tube substantially prevents radial play of the element.

As may be seen in Fig. 3, the pulley groove 32 in the disk 23 is of such depth that the flexible element 15 is receivable therein to the extent that an outer portion of the flexible element bears against the adjacent wall of the nest 27. In this connection, the parts should be so related that the flexible element is held against radial movement when the parts are assembled. The end of the flexible element is secured to the disk 23 in any suitable manner, as by bending the end of said element to form a short angular nib 35 which is snugly receivable in a radial bore 36 communicating with the groove 32.

At one side of the recess 27, the base 16 is cut-away or recessed as at 37, and a straight groove 38 of approximately semi-circular cross section extends through the recessed portion 37. The groove 38 is tangential of the groove 32 in the disk 23 and is a continuation of said groove so that the flexible element 15 will be guided in a straight line as it leaves the pulley groove. A flat plate 39 (Figs. 2 and 5) fits snugly within the recess 37 and is secured rigidly therein by such means as screws 40. Preferably, the end of the groove 38 remote from the recess 27 is enlarged to receive the end of the wire guide tube 34. The plate 39 engages this part of the tube 34 to clamp it securely in place.

Means of any suitable character is provided for limiting the rotation of the disk 23 in either direction. Figs. 2, 3 and 4 show a preferred form of such means wherein the face of the disk 23, adjacent the base 16 is provided with an arcuate groove 23$^a$, which is traversed by a partition 23$^b$. The base 16 has an arcuate lug 23$^c$ extending therefrom to enter the groove 23$^a$. This arrangement allows the disk 23 to rotate freely but limits such rotation in either direction, to less than one complete circumference. Moreover, the construction permits a large area of the face of the disk to abut against the face of the base so that the action of the screw 24 and washer 25 in adjusting frictional resistance to disk movement is enhanced. It should be noted that in the structure which has been described the flexible element may be wound around the pulley member and also fed therefrom while being positively held against radial movement.

Referring now to Fig. 6, the flexible element 15 extends to the case of the receiving set through which it passes into the interior thereof. Preferably, the guide tube 34 surrounding the flexible element is secured to a wall 41 of the casing or other stationary part, such attachment being best effected by a screw chuck device 42 which is capable of engaging the tube firmly without collapsing it. The condenser shaft 12 has a disk 43 secured thereto, as by set screws 44, the peripheral edge of said disk being grooved, as at 45, to receive the end of the flexible element 15. A clamp 46 overlies the groove 45 at an appropriate point and is adjustable by means of the screw 47 to secure the free end of the flexible element 15 in the groove. Preferably, the element normally extends a substantial distance around the disk.

Resilient means of any suitable character are provided for exerting a force tending to move the condenser shaft 12 and disk 43 in one direction. One form of such means is shown in Figs. 6 and 7 as comprising a flat, spirally-wound spring 48 of substantial strength, the outer end of which is curled to fit about any one of a number of pins 49 disposed near the periphery of the disk 43. The other end of the spring engages a stationary part and, in this embodiment, a cup-shaped member 50 fits about the condenser shaft and is secured, as by means of ears 51, to the adjacent wall of the condenser 52. A slot 53 in the cup-shaped member receives the inner end of the spring 48.

By this construction, it will be seen that the spring 48 resists rotational movement of the shaft 12 and disk 43 in one direction. This resisted direction of movement is that which is produced in the disk 43 when the flexible element 15 is pulled into the remote control casing by rotation of the disk 23. In other words, referring to Figs. 2, 4 and 6, as the disk 23 is rotated counterclockwise, the flexible element 15 will be caused to wind around the annular portion 26 of the disk. The flexible element 15, therefore, moves in the direction of its length, which is to the right in Fig. 6, thereby causing the disk 43 and shaft 12 to rotate counterclockwise. The tension of the spring 48 is so adjusted, by means of its connection with one or another of the pins 49, that the force exerted thereby is ample to maintain the flexible element 15 at all times under tension. Yet the force exerted by the spring is less than that force which would be required to overcome the frictional resistance offered to movement by the gears 28 and 29, disk 23, and their associated parts. Consequently, when the device has been adjusted to any tuned position of the condenser shaft 12, the parts will positively remain in that position. However, again referring to Figs. 2, 4 and 6, if the disk 23 is rotated in a clockwise direction, the flexible element 15 will be fed out of the remote control casing. This movement exerts a force which moves the flexible element toward the left, as seen in Fig. 6, and has a positive tendency to rotate the disk 43 in a clockwise direction. This tendency is amplified and made effective by the force of the spring 48. As a result, the condenser shaft is rotated clockwise. Any incidental looseness or play in the connections is positively eliminated since the flexible element 15 is constantly under tension and the force exerted by the spring 48 is more than that required to rotate the condenser shaft 12 when the frictional resistance to such movement is relieved by manipulation of the disk 23. The condenser shaft 12 and the disk 23 may, therefore, by synchronously adjusted when the parts are assembled and this adjustment is positively maintained with exceeding accuracy during the adjusted movements of the condenser shaft in either direction.

The chuck device 42 has an important function in facilitating adjustment of the set for proper operation. Thus, the chuck 42 is secured to a wall of the chassis case or, if desired, to a stationary part of the chassis itself and the axis of the chuck is substantially alined with the groove in the disk 43. Assuming that the parts are to be assembled together for installation in a vehicle or the like, the opposite ends of the flexible element 15 must be properly secured to the disks 23 and 43. As a practical matter, it is next to impossible to secure the flexible element to the disk 43 after the chassis of the receiving set has been mounted within its enclosing case. But, when the flexible element and disk are secured together before the chassis is movd into its final or operative position, accurate establishment of the connections so that the condenser shaft and the disk 43 will be at one limit of movement and the remote control disk 23 at a corresponding limit of movement cannot be made. This relationship between the disks 43 and 23 is important for proper and efficient operation of the device. In the present instance, the chuck 42 and the adjustable engagement thereof with the guide tube 34 provides a means whereby the desired adjustment may be rapidly and accurately made after the parts have been assembled in their operative position as shown in Fig. 1. In making said adjustment, the flexible element 15 is connected with the disks 23 and 43, the chassis installed within its enclosing case, and the remote control box mounted upon the steering column. In this position of the parts, it will be seen that the rotational axes of the disks 23 and 43 are permanently fixed. Hence, if the guide tube is adjusted toward or away from one of said disks, the same result is obtained as if the disks themselves were adjusted toward or away from each other since such adjustment of the guide tube is in effect an increasing or decreasing of the distance between the axes of said disks. Utilizing this fact, the person installing the device adjusts the device in the following manner, it being understood that this manner is the most convenient way in which the operation may be performed. The remote control disk 23 is rotated to a selected point, usually one limit of its movement. The direction in which the condenser shaft must move, to reach its corresponding point or limit of movement, is then ascertained. The guide tube 34 is next adjusted longitudinally in one direction or the other with respect to the chuck 42, which adjustment either allows the disk 43 and condenser shaft to move until the limit is reached or takes up any slack which might be present in the flexible element 15. Thus, without difficulty a proper operating relationship between the parts may be obtained.

For the purpose of designating the tuning of the receiver at the remote control box, the disk 23 carries an annular, outwardly extending drum 54 preferably formed of celluloid or a similar semi-transparent material, the surface of which carries the usual tuning indicia (not shown). These indicia are visible through a suitably located aperture 55 formed in the cover 17 adjacent the drum 54 to face upwardly toward the operator when the box is properly mounted.

The remote control box carries means for controlling the volume of the receiver. For this purpose, the cover element 17 carries a rheostat 56 of any suitable construction. A movable contact arm 57 is secured to a shaft 58 which is journaled on the cover and is manipulated by a finger piece or tuning knob 59. For compactness, the rheostat is located within the drum 54 when the parts are assembled.

An illuminating device, generally indicated at 60, is mounted upon the base within the housing in order to render the indicia on the drum 54 readily visible.

The wiring connections for the present device are of customary arrangement and form no part of the present invention. Lead wires to the rheostat, to the illuminating device, and for the control of the power circuit, extend from the remote control box through a conduit 61 to a terminal or distributor box 62, shown in Fig. 1, which is secured, as to the frame 63 of the vehicle, in some convenient out-of-the-way position. A conduit 64 encloses the necessary leads from the receiver to the terminal box. A lead 65 extends from the terminal box to one terminal of a battery 66, the other terminal of which is grounded as at 67 to the frame of the vehicle.

Switch means may be provided in the control box for starting or shutting off the operation of the receiver. This means is preferably a conventional type of key-operated switch 68 embodying switch fingers 69 arranged to be actuated by a key 70 to close or break the power circuit of the receiver. Such a switch prevents unauthorized operation of the receiver.

It will be apparent from the foregoing that a novel remote control device has been provided which possesses many advantageous features. Thus, the receiver is tuned or adjusted at a remote point by the same movements which an operator would use in adjusting the receiver at the set. That is to say, the rotary motion at the control box is translated into reciprocatory movement of the flexible connecting element, which, in turn, is translated into rotary motion of the condenser shaft. The incorporation with these mechanical connections of a means for maintaining the flexible element under tension or, more broadly stated, for preventing lost motion, backlash, or play in the connections permits the movements of the condenser shaft to be synchronized with those of the remote control tuning element. Consequently, a station will always be tuned in at the same point on the indicator drum irrespective of the direction in which the remote control element is manipulated. The present organization is simple in construction, embodies few operative parts whereby the device is substantially fool-proof and allows the receiver to be permanently mounted in an out-of-the-way position.

I claim as my invention:

1. A remote control box for a radio receiving set comprising, in combination, a casing formed of separable sections, one of said sections having a rotatable control element mounted thereon, a cylindrical member affixed to said element for presenting tuning indicia to the operator, and a volume control instrumentality carried by the other section and occupying part of the space encircled by said cylindrical member when the parts are assembled.

2. A control box for a device of the character described comprising the combination of a base, means for securing said base to a supporting member, a pulley having a groove therein rotatably journaled in said base, said base having a recess therein for receiving and snugly encircling said pulley, a manually manipulable shaft journaled in said base, the rotational axes of said pulley and shaft being parallel, reduction gears interposed between said shaft and said pulley, a groove formed in said base extending tangentially of and in alinement with the groove in said pulley, and a plate overlying said groove to provide a bore in said base, said bore in the base and the bore defined by the groove in the pulley and the adjacent wall of the recess being of a size snugly to receive a flexible operating element.

3. In a remote control device for radio receiving sets, the combination of a pair of rotatably mounted annularly grooved members, one of said members being connected with the tuning shaft of a receiver and the other being located at a point remote therefrom, a flexible cable connecting said members and arranged to extend into the grooves to unite said members for conjoint movement in substantial synchronism, a flexible tube enclosing said cable substantially between the groove engaging portions of the cable, means embracing one of said members and having a part opposing the groove therein to maintain the cable in the groove, said means having a passageway therein extending generally tangential to the groove in the embraced member through which the cable passes into engagement with the groove, and a clamping member detachably secured to said means and overlying said passageway to confine the cable thereto, said clamping member having an engagement with the adjacent end of the flexible tube to bind said tube between the clamping member and the underlying means.

4. In a remote control device for radio receiving sets, the combination of a casing for the remote control elements, a drum-like member rotatably mounted in said casing, means including a part disposed externally of the casing for rotating said member, a rheostat supported within and substantially enclosed by the drum-like member, and operating means for said rheostat located externally of said casing.

5. A control box for a device of the character described comprising the combination of a casing, means for securing said casing to the steering column of a vehicle, said casing having an aperture therein facing upwardly toward the driver of the vehicle when the box is so secured on the steering column, a pulley journaled in said casing on a horizontal axis, an indicator drum carried by said pulley within said casing for movement past said aperture, a manipulating shaft mounted on said casing on an axis parallel to said pulley axis and extending through a side wall of the casing, driving connections between said shaft and pulley, and an operator's finger-piece mounted on said shaft externally of the casing.

6. In a remote control device for radio receiving apparatus the combination of a housing for the remote control elements constructed to be secured to the steering column of a vehicle, control mechanism journalled in said housing for rotation in actuation of the tuning element of the receiving apparatus, means extending externally of said housing and connected with said mechanism for manual actuation thereof, a volume control rheostat mounted in said housing adjacent to said mechanism, and a rheostat operator mounted for oscillatory movement substantially about the axis of rotation of said mechanism as a center and manipulable from the outside of said housing.

7. A control box of the character described comprising the combination of a base, means for securing said base to a supporting member, a pulley having a groove therein rotatably mounted on said base, said base having a recess therein for receiving and snugly encircling said pulley, a manually manipulable shaft mounted for rotation on an axis paralleling the axis of said pulley, reduction gears interposed between said shaft and pulley, a part detachably mounted on said base, said part and said base being fashioned to define therebetween a second groove which extends tangentially of and is alined with the groove in said pulley and is longitudinally exposed when said part is detached from said base, and a flexible operating element secured to said pulley and disposed in the groove therein and extending from said pulley through said second groove.

8. In a control device for radio receiving sets having a tuning shaft, the combination of resilient means connected with said shaft for rotating the shaft in one direction, a flexible member connected with said shaft and acting thereon when pulled to rotate the shaft in the opposite direction against the force of said resilient means, control means at a remote point connected with said flexible member and manually operable to pull said member in one direction, tubular guide means surrounding said flexible member and rigidly fixed at said remote point, and a chuck mounted on a stationary part at the set end of the flexible member for rigid holding engagement with the other end of said guide means, said chuck being located in spaced relation to the point of connection of said flexible member with said shaft whereby the detachable connection between the chuck and the guide means may be utilized as an adjustment for obtaining a proper operating relationship between the tuning shaft and the control means.

9. In a remote control device for radio receiving sets, the combination of a pair of rotatably mounted annularly grooved members, one of said members being connected with the condenser shaft of a receiver and the other being located at a point remote therefrom, a flexible cable connecting said members and arranged to extend into the grooves to unite said members for conjoint movement in substantial synchronism, a flexible tube enclosing said cable substantially between the groove engaging portions of the cable, means embracing one of said members and having a part opposing the groove therein to maintain the cable in the groove, said means having a passageway therein extending generally tangential to the groove in the embraced member through which the cable passes into engagement with the groove, and a member detachably secured to said means and overlying said passageway to confine the cable thereto.

10. In a remote control device for radio receiving apparatus, the combination of a casing disposed at a point remote from said apparatus, a pulley-like member journaled in said casing, a flexible operating element connected with said member and extending therefrom and from said casing, means for maintaining said element in close contact with said pulley-like member, and means for confining the movement of said element as it passes from said pulley-like member strictly to a longitudinal movement comprising separable parts having abutting faces of substantial area, at least one of said faces being provided with a traversing groove for receiving said flexible element, and means for securing said parts together whereby in assembling the device the flexible element may be easily positioned in said groove before the separable parts are secured together.

11. A remote control box for a radio receiving set comprising, in combination, a casing, means at one side of said casing for securing said casing to the steering column of a vehicle, said casing having an aperture therein facing upwardly toward the driver of the vehicle when the box is mounted on the steering column, control means mounted in said casing for movement in an adjustment of the receiving set and including a manipulating shaft extending toward the side of the casing opposite that side by which the casing is secured to the steering column, indicating means connected with said shaft for driven movement past said aperture, and an operator's finger piece mounted on said shaft for convenient manipulation by an operator and disposed on the side of the casing opposite that by which the casing is secured to the steering column.

12. In a control box, the combination of a casing, means for securing said casing to the steering column of a vehicle, said casing having an aperture therein facing upwardly toward the driver of the vehicle when the box is so mounted on the steering column, a rotatable control element mounted in said casing for movement on a horizontal axis, an indicator within said casing connected to said rotatable element for movement past said aperture, a manipulating shaft drivingly connected with said rotatable element and mounted for rotation on an axis parallel to the axis of said rotatable element and extending toward the side of said casing remote from the steering column, and a finger piece mounted on said shaft for manipulation by an operator.

13. In a remote control device for radio receiving sets, operating mechanism for the tuning shaft of the receiving set including a disk connected to the tuning shaft and having a groove therein, a flexible element secured to said disk in engagement with said groove and extending to a remotely positioned operator, a plate stationary with respect to the receiving set chassis, a spirally wound spring connected at its inner end with said plate, and a plurality of pins arranged in circular series and fashioned for optional engagement with the outer end of the spring whereby on assembly of the device the tension of the spring exerted on the disk may be varied by connecting the spring with one or another of said pins.

14. In a control box for a remote control device for radio receiving sets, the combination of a casing having a base provided with a circular recess within said casing, a combined gear and pulley element having the pulley part seated snugly in said recess with the gear part overlapping the margin of the recess, a second gear journaled in said base adjacent to the periphery of said gear part for meshed engagement therewith, and an indicator carried by said combined gear and pulley element, said casing having an aperture therein through which the indicator is visible.

15. In a control box for a remote control device for radio receiving sets, the combination of a casing having a base provided with a circular recess within said casing, a combined gear and pulley element having the pulley part seated snugly in said recess, and means for securing said combined gear and pulley element in position including a spring washer disposed to exert a force tending to hold said gear and pulley element seated in said recess.

16. In a control box for a remote control device for radio receiving sets, the combination of a casing having a base provided with a circular recess within said casing, a combined gear and pulley element having the pulley part seated snugly in said recess with the gear part overlapping the margin of the recess, a flexible element engaged with said pulley, said base having a groove therein extending from said recess in a direction tangential thereto through which said flexible element passes from its engagement with said pulley, and a plate secured to said base in overlying relation to said groove for confining said flexible element thereto, said plate being disposed in part between the overlapping portion of said gear part and said base and extending to a point substantially adjacent to said recess.

17. In a control box for a remote control device for radio receiving sets, the combination of a casing having a base provided with a circular recess within said casing, a combined gear and pulley element having the pulley part seated snugly in said recess with the gear part overlapping the margin of the recess, a second gear journaled in said base at one side of said combined gear and pulley element for meshed engagement with said gear part, and means for variably imposing a resistance to rotational movement upon said second gear.

18. In a control box for a remote control device for a radio receiving set, the combination of a casing having a base provided with a circular recess, a combined gear and pulley element rotatably mounted on said base with the pulley seated snugly in said recess, a second gear operatively engaging said first mentioned gear, and means for limiting the movement of said gear and pulley element relative to the base including a pin carried by the base and an arcuate groove in said gear and pulley element for receiving said pin.

19. In a control box for a remote control device for a radio receiving set, the combination of a casing having a base and a separable cover, receiving set operating mechanism mounted in said casing, and means for securing said casing to the steering column of a vehicle comprising a split bracket fashioned to embrace said column, one part of said bracket being permanently affixed to the outer face of said base.

EDWARD L. BARRETT.